(12) United States Patent
Nguyen et al.

(10) Patent No.: US 6,411,661 B1
(45) Date of Patent: Jun. 25, 2002

(54) DIGITAL TIMING RECOVERY LOOP FOR GMSK DEMODULATORS

(75) Inventors: Tien M. Nguyen, Fullerton; Jack K. Holmes, Los Angeles; Srini H. Raghavan, Rancho Palos Verdes, all of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/307,231

(22) Filed: May 7, 1999

(51) Int. Cl.$^7$ .......................... H03D 3/00; H04L 27/14; H04L 27/22

(52) U.S. Cl. ...................... 375/336; 375/326; 329/300; 329/304

(58) Field of Search ................................. 375/145, 149, 375/274, 324, 326, 327, 336, 344; 329/300, 304, 307, 308

(56) References Cited

U.S. PATENT DOCUMENTS

| | | | |
|---|---|---|---|
| 3,795,865 A | * 3/1974 | Armstrong | 375/232 |
| 4,384,357 A | 5/1983 | deBuda et al. | |
| 4,466,108 A | * 8/1984 | Rhodes | 375/329 |
| 4,494,211 A | 1/1985 | Schwartz | |
| 4,691,176 A | * 9/1987 | Hsiung et al. | 331/2 |
| 5,131,008 A | 7/1992 | Kazecki et al. | |
| 5,144,256 A | 9/1992 | Lim | |
| 5,150,070 A | 9/1992 | Rinaldi et al. | |
| 5,343,498 A | * 8/1994 | Toy et al. | 375/259 |
| 5,625,652 A | * 4/1997 | Petranovich | 375/355 |
| 5,640,125 A | * 6/1997 | Alard | 329/306 |
| 5,640,431 A | * 6/1997 | Bruckert et al. | 375/344 |
| 5,659,573 A | * 8/1997 | Bruckert et al. | 375/142 |

OTHER PUBLICATIONS

DeBuda, Rudi, "Coherent Demodulation of Frequency–Shift Keying with Low Deviation Ration," IEEE Transactions on Communications, IEEE, p. 429–435, (Jun. 13, 1972).

D'Andrea, A. N. et al, "Carrier Phase and Clock Recovery for Continuous Phase Modulated Signals," IEEE Transactions on Communications, IEEE, vol. 35 (No. 10), p. 1095–1101, ( Oct. 13, 1987).

Booth, R. W. D., "Carrier Phase and Bit Sync Regeneration for the Coherent Demodulation of MSK," IEEE, p. 6.1.1–6.5, (Apr. 13, 1978).

Glisic, S. G., "Symbol Synchronization in Digital Communication Systems Using Partial Response CPM Signaling," IEEE Transactions on Communications, IEEE, vol. 37 (No. 3), p. 298–308, (Mar. 13, 1989).

Holmes, J. K., "Coherent Spread Spectrum Systems," Wiley and Sons, p. 564–621.

* cited by examiner

Primary Examiner—Young T. Tse
(74) Attorney, Agent, or Firm—Derrick Michael Reid

(57) ABSTRACT

A GMSK timing recovery loop in a receiver of a Gaussian Minimum Shift Keying (GMSK) link with a low channel Bit Signal-to-Noise Ratio (BSNR) and a small bandwidth-bit period BT product in a high bandwidth efficiency channel, includes a hard limiter for converting at baseband a GMSK demodulated received signal into a hard clocking signal clocking a conventional digital tracking transition loop generating the bit timing signal in closed loop control for stable time tracking performance for coherent demodulation of GMSK signals. The hard limiter provides the hard clocking signal at baseband having transitions at multiple bit periods adjusted by the bit timing error signal from the digital tracking transition loop for providing reduced jitter of the bit timing signal for accurate timing recovery and detection of communicated data.

7 Claims, 3 Drawing Sheets

GMSK COMMUNICATION SYSTEM

GMSK COMMUNICATION SYSTEM

GMSK TIMING RECOVERY LOOP

NORMALIZED TIMING JITTER

DIGITAL TIMING RECOVERY LOOP FOR GMSK DEMODULATORS

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of communication systems. More particularly, the present invention relates to timing recovery loops used in Gaussian Minimum Shift Keying (GMSK) receivers for recovering transmitted data.

BACKGROUND OF THE INVENTION

Communication systems communicate signals using a variety of modulation methods. One such modulation method is Gaussian Minimum Shift Keying (GMSK). GMSK is a form of continuous phase modulation method exhibiting compact spectral occupancy and a constant envelope, thus making it compatible with a non-linear power amplifier operation without the concomitant spectral re-growth associated with non-constant envelope signals. As demands for channel capacity increase, the need for bandwidth-power efficiency with constant envelope modulation techniques is also increased. The GMSK modulation technique satisfies these two requirements. The GMSK modulation technique exhibits a constant envelope waveform with the occupied bandwidth determined by the BT product, where B denotes the 3 dB bandwidth of the baseband Gaussian filter, and T is the bit duration. These attributes render GMSK an attractive modulation scheme in communication systems where only a limited system bandwidth is available.

A formatted data signal, such as a non-return to zero (NRZ) data stream of a series of respective data pulses, is passed through a Gaussian filter and an integrator providing a continuous output for modulating the phase of the carrier signal. The output of the Gaussian filter is a series of Gaussian filter pulse responses that are passed through the integrator providing a continuous voltage signal to a phase modulator that phase modulates the carrier signal. Each of the predetermined number of prior data pulses contribute a signal component to the current output of the integrator at the current bit time. That is, the continuous output of the integrator at each bit time depends upon a predetermined number of prior data bits, that is, a predetermined number of prior data pulses that are inputted into the Gaussian filter and integrator, and hence the Gaussian filter and integrator have a memory represented by signal components from the prior data bits, or data pulses. This memory is known as intersymbol interference where a first data pulse is a symbol communicated as a signal having pulse filter response components lying within the time duration of the signal of a subsequent symbol of a subsequent data pulse.

In typical implementations, the NRZ data stream is a series of pulses having +/−1V voltage levels. Each +1V or −1V pulse contributes to a phase response that is accumulated over time. The Gaussian filter provides pulse responses to the +1V or −1V data pulses that are accumulated through the integrator. Each of the pulse responses is integrated to provide a respective phase shift of +/−$\pi$/2. The integrator provides a modulo $2\pi$ accumulated phase response of all of the +/−$\pi$/2 phase responses respectively for each Gaussian filter pulse response. The integrator output is hence an accumulated phase response from a predetermined number of prior data bits. The resulting modulo $\pi$/2 phase response is hence a continuous accumulated phase output that is a function of the prior predetermined number of data bits and resulting Gaussian filter pulse responses. The continuous accumulated phase integrator output is inputted into the phase modulator modulating the carrier signal for providing a transmitted GMSK phase modulated carrier signal where the modulated phase is the accumulated phase reduced modulo $2\pi$ representing all the previous data bits.

The GMSK phase modulated signal arrives at a receiver arbitrarily in time creating a carrier phase between the arrived carrier signal and a locally generated carrier signal used for coherent demodulation reception. Upon reception of the GMSK signal, the carrier phase must be firstly determined for demodulating the GMSK signal so that the resulting accumulated data phase can be determined to then enable reconstruction of the data stream at the receiver. Hence, determining the carrier phase is essential in coherent communications so that the carrier phase modulated by the data stream can be determined to recover the data. The current phase is the sum of a carrier phase and the accumulated data phase of the previous data channel bits.

The GMSK receiver includes a GMSK carrier tracking loop for tracking the carrier phase and frequency estimates for demodulating the GMSK carrier signal into the GMSK baseband signal. After carrier synchronization and demodulation, the GMSK carrier tracking loop provides a replica of the Gaussian filter response that is a time varying analog signal upon which the Gaussian time recovery loop operates to derive a timing signal for bit synchronization for reconstructing the data sequence.

Various forms of GMSK timing recovery loops using squaring loops have been described. GMSK Carrier and timing recovery techniques have used squaring or costas loops. GMSK modulators and demodulators operate at high bit signal to noise ratios (BSNR), that is, with BSNR greater than zero Db, and with Gaussian bandwidth-bit time duration products BT greater than 0.25. The GMSK demodulator has been used for carrier and bit timing synchronization under these conditions. For small values of BT and low BSNR, the carrier and bit synchronization for GMSK demodulators become extremely difficult. The loss due to squaring and self-noise due to intersymbol interference is unavoidable degrading system performance. Digital GMSK tracking loops do not perform very well in the presence of non-random data patterns where the discrete components for carrier and clock recovery may vanish. For data-derived timing recovery techniques which do not utilize squaring loops, the performance of the bit synchronizing tracking transition loops depends heavily on the BSNR and BT. For low BSNR and small BT, timing recovery becomes extremely difficult because of intersymbol interference and non-distinguishable bit transitions. For recovery of the carrier and bit timing information, the performance degradation, in terms of the carrier phase and timing jitter, associated with the existing schemes, are quite high at very low BSNR and small values of BT.

The GMSK carrier tracking loop has employed reverse modulation techniques for recovering the carrier phase coherently. Reverse modulation technique for tracking the GMSK signal with BT=0.3 use a phase locked loop with second order loop filter employed by the reverse modulator. The received signal R(t) is received by a reverse modulator in the GMSK carrier tracking loop to create the carrier tone fc that is acquired and tracked by the phase lock loop. The GMSK carrier tracking loop tracks the carrier tone fc to create a carrier reference that is generated by the phase lock loop for carrier demodulation of the received signal R(t), as is well known in the art. The reverse modulation techniques are used to avoid squaring loss associated with the costas or squaring loop.

For binary phase shift keying (BPSK), quadrature phase shift keying (QPSK), and M-ary phase shift keying, the communication signal is a square wave in nature and digital tracking transition loops (DTTL) are used for bit synchronization. That is, the DTTL is designed to track the baseband square waves of demodulated received signals. The DTTL performs optimally when the square wave signals are received in the presence of the additive white Gaussian noise. Digital transition tracking loops as part of a GMSK timing recover loop have been applied to demodulated GMSK received signals that are highly distorted square wave signals. The GMSK timing recovery loop operates upon the demodulated received GMSK signal using forms of a squaring loop or frequency doubler followed by a phase locked loop for bit timing recovery. The timing clock for timing recovery in the GMSK timing recovery loop is created by squaring the received demodulated signal, and the phase lock loop is tuned to the clock frequency for bit timing recovery. The demodulated GMSK received baseband signal containing data information, however, is severely distorted due to the Gaussian filtering at small BT products where the 3 dB cut-off frequency of the Gaussian filter is smaller than the data rate of the baseband signaling. Therefore, for small BT products of GMSK Gaussian filters, both prior GMSK timing recovery loops and DTTLs are not capable of recovering the timing information based on the received analog Gaussian filter response waveform. These and other disadvantages are solved or reduced using the invention.

SUMMARY OF THE INVENTION

An object of the invention is to improve the bit error rate of Gaussian minimum shift keying (GMSK) demodulators.

Another object of the invention is to reduce data bit timing jitter of GMSK demodulators.

Another object of the invention is to provide a GMSK timing recovery loop including a digital tracking transition loop for bit synchronization of a received data sequence.

Another object of the invention is to hard limit a GMSK demodulated received signal for operating a digital tracking transition loop at baseband for the reduction of data bit timing jitter.

Another object of the invention is to provide GMSK timing recovery loop operating at baseband for timing synchronization of a received digital bit sequence.

The invention is directed to an improved GMSK timing recover loop in a GMSK receiver for providing a bit synchronization timing signal that is used for reconstructing a data sequence. The GMSK timing recovery loop includes a hard limited and a conventional digital tracking transition loop that has been used in binary phase shift keying (BPSK) and quadrature pulse shift keying (QPSK). The improved GMSK timing recovery loops operates at baseband and provides reduced bit timing synchronization jitter for reducing bit error rates. The improvement lies in the combination of a hard limiter and a digital transition tracking loop within the timing recovery loop where the synchronization performance is insensitive to the values of BT and low bit signal to noise ratios (BSNR). The improved GMSK timing recovery loop solves the GMSK bit synchronization problems for GMSK links with a low channel BSNR and small BT system using a conventional digital tracking transition loop coupled to a hard limiter for bit timing recovery. Additionally, the GMSK carrier tracking loop preferably is a reverse modulation carrier tracking loop for improved carrier tracking.

The improved GMSK timing recovery loop enables recovery of the bit timing signal τb(t) with high accuracy at low BSNR and small BT product, and has the advantage of negligible loss due to non-random data patterns. Another advantage associated with GMSK timing recovery loop is that it adopts the well-known digital transition tracking loop (DTTL) used in M-ary PSK systems with a modification of adding the hard limiter. The GMSK system includes the modulator and the demodulator between which is transmitted the GMSK signal. The demodulator includes a carrier tracking loop for providing a GMSK demodulated received signal Ro(t) and a bit timing recovery loop for providing the bit timing signal τb(t). The carrier tracking loop preferably employs the reverse modulation. The GMSK timing recovery loop performance employs the hard limiter adjusted by a bit timing error signal τe(t) for improved insensitivity to the values of BT while operating at low BSNR. The GMSK timing recovery loop take advantage of the observation that the cosine of the baseband GMSK signal has zero-crossings at multiples of the bit duration. The hard-limiter is used to create the NRZ data stream clocking signal that has the zero-crossings at multiples of the bit duration. The digital transition tracking loop is then used to track the zero-crossings of the NRZ data stream clocking signal from the received demodulated GMSK signal, and the bit timing signal is then generated by the DTTL with less jitter for improved data detection. In the GMSK timing recovery loop, the hard limiter is adjusted by the bit timing error signal τe(t) to reduce jitter in tracking the NRZ data stream. Hence, the digital transition tracking loop tracks the adjusted zero-crossings of the NRZ data stream, and the reduced jitter bit timing signal τb(t) is then generated for accurate data detection.

During data detection, the bit timing error signal τe(t), provided by the DTTL, pre-adjusts the zero crossing of the hard clock signal from the hard limiter for driving the DTTL at precise bit periods. The bit timing error signal τb(t) provided by the DTTL is used by the hard limiter to adjust the zero-crossings of the received demodulated signal Ro(t) to produce accurate timing transitions for the DTTL as part of a feedback approach. The bit timing error signal adjusts the zero-crossings of the received demodulated signal Ro(t) to produce accurate transitions for the hard limiter as tone tracking within a feedback loop.

Initially, the hard limiter provides the NRZ square wave transition clocking signal corresponding to the zero crossings of the received demodulated signal having time durations equaling to multiples of the bit period with the DTTL functioning to divide each square wave into an integer number of square waves corresponding to the number of bit periods without the hard limiter clocking signal in the feedback loop and without the transitions being adjusted. This open loop operation of the hard limiter is initially used to drive the DTTL in open loop with no adjustment of the zero-crossings of the demodulated received signal Ro(t) to firstly reduce the bit timing error signal τe(t) of a low predetermined value so that the bit timing error is less than ½ of a bit period. After this initialization, when the bit timing error signal τe(t) is reduced, the reduced bit timing error signal then secondly adjusts the received demodulated signal zero crossing transition for further reducing the jitter of the bit timing signal τb(t). For bit timing recovery at low BSNR and small BT, the feedback connection of the bit timing error signal τe(t) reduces the amount of jitter of the bit timing signal τb(t), while the initial non-feedback configuration is advantageous for initial acquisition. These and other advantages will become more apparent from the following detailed description of the preferred embodiment.

DETAILED DESCRIPTION OF THE PREFERRED EMBODIMENT

Figure 1:
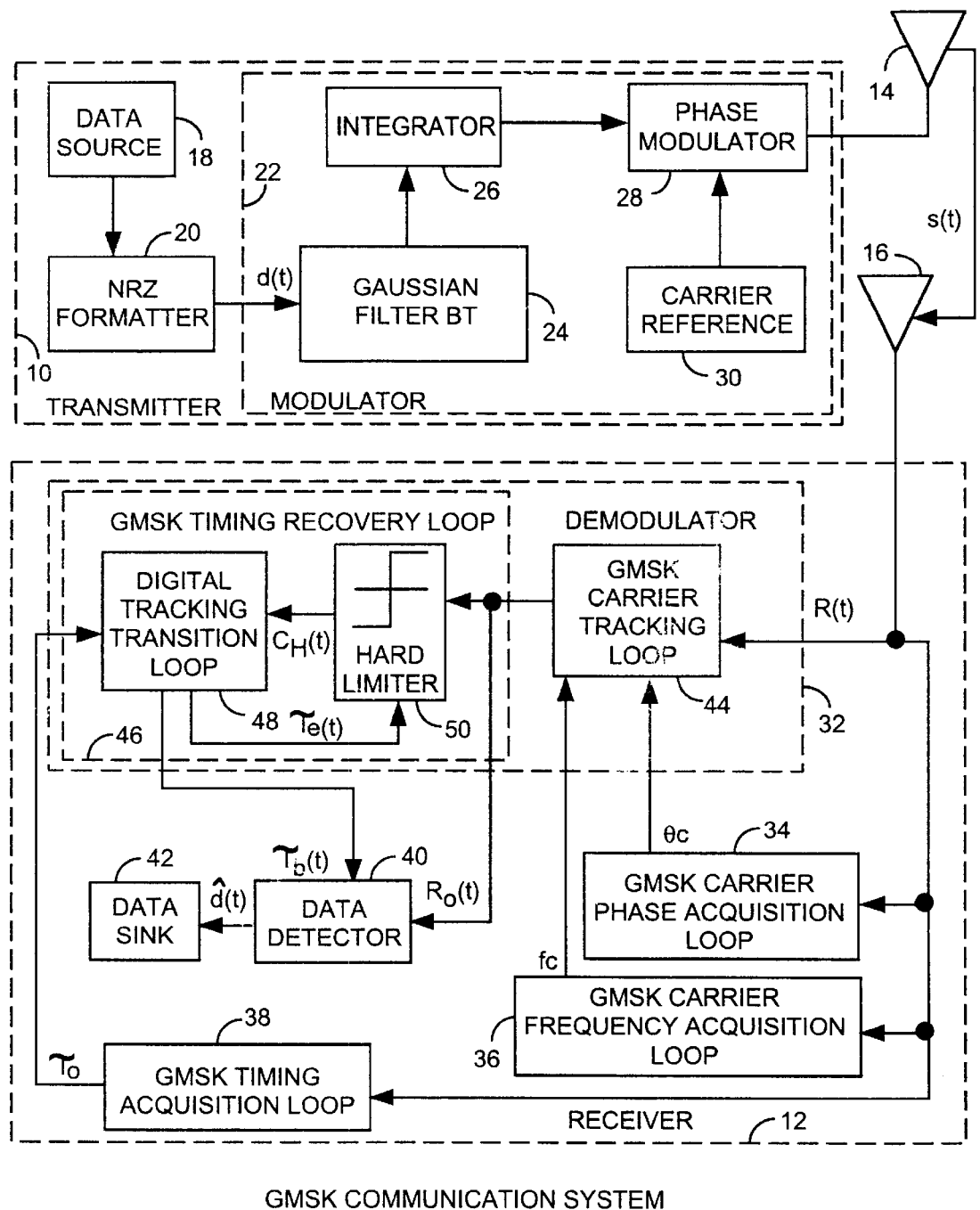
FIG. 1 is a block diagram of a GMSK communication system having a GMSK timing recovery loop including a digital tracking transition loop and a hard limiter.

An embodiment of the invention is described with reference to the figures using reference designations as shown in the figures. Referring to FIG. 1, a Gaussian minimum shift keying (GMSK) communication system includes a transmitter 10 and a receiver 12 communicating GMSK signals S(t) from a transmitting antenna 14 to a receiving antenna 16. The transmitter 10 includes a data source 18, a formatter 20 and a modulator 22. The formatter 20, such as an NRZ formatter, communicates a sequence of data pulses d(t) to the modulator 22 that in turn includes a Gaussian filter 24 receiving the data pulses d(t) and providing pulse responses, an integrator 26 receiving the pulse responses and providing phase responses, and a phase modulator having a modulation index of $\pi/2$ for modulating a carrier reference 30 by the phase response to generate the GMSK signals S(t) transmitted from antenna 14. The transmitter 10 is of conventional design. The signal S(t) arrives at the receiving antenna 16 arbitrarily in time as a received signal R(t) having a carrier phase difference between the arrived signal R(t) and a locally generated carrier reference, not shown. The receiver 12 includes a demodulator 32 for demodulating the receive signal R(t) into a demodulated received signal Ro(t) and for generating a bit synchronization timing signal τb(t). The receiver 12 also includes a GMSK carrier phase acquisition loop 34 for estimating the carrier phase θc and a GMSK carrier frequency acquisition loop 36 for estimating the carrier reference fc. This is required due to the difference in frequency caused by Doppler shifts and Doppler shift rates. The receiver 12 further includes a GMSK timing acquisition loop 38 for providing a bit synchronization estimate signal τo, and includes a data detector 40 for receiving and detecting the demodulated receive signal Ro(t) and the bit synchronization signal τb(t) for reconstructing and estimating the data sequence d̂(t) communicated to a data sink 42. The demodulator 32 includes a GMSK carrier tracking loop 44 for receiving the received signal R(t), the carrier phase estimate θc and the carrier frequency estimate fc for generating the demodulated receive signal Ro(t). The demodulator 32 further includes a GMSK timing recovery loop 46 for receiving the initial timing synchronization estimate signal τo and the demodulated received signal Ro(t) and for generating the bit synchronization timing signal τb(t). The receiver 12 is of conventional design with an improvement in the GMSK timing recovery loop 46 including a conventional digital tracking transition loop 48 and a hard limiter 50 that provides a hard clocking signal $C_H(t)$ for improved bit synchronization and bit period tracking.

Figure 2:
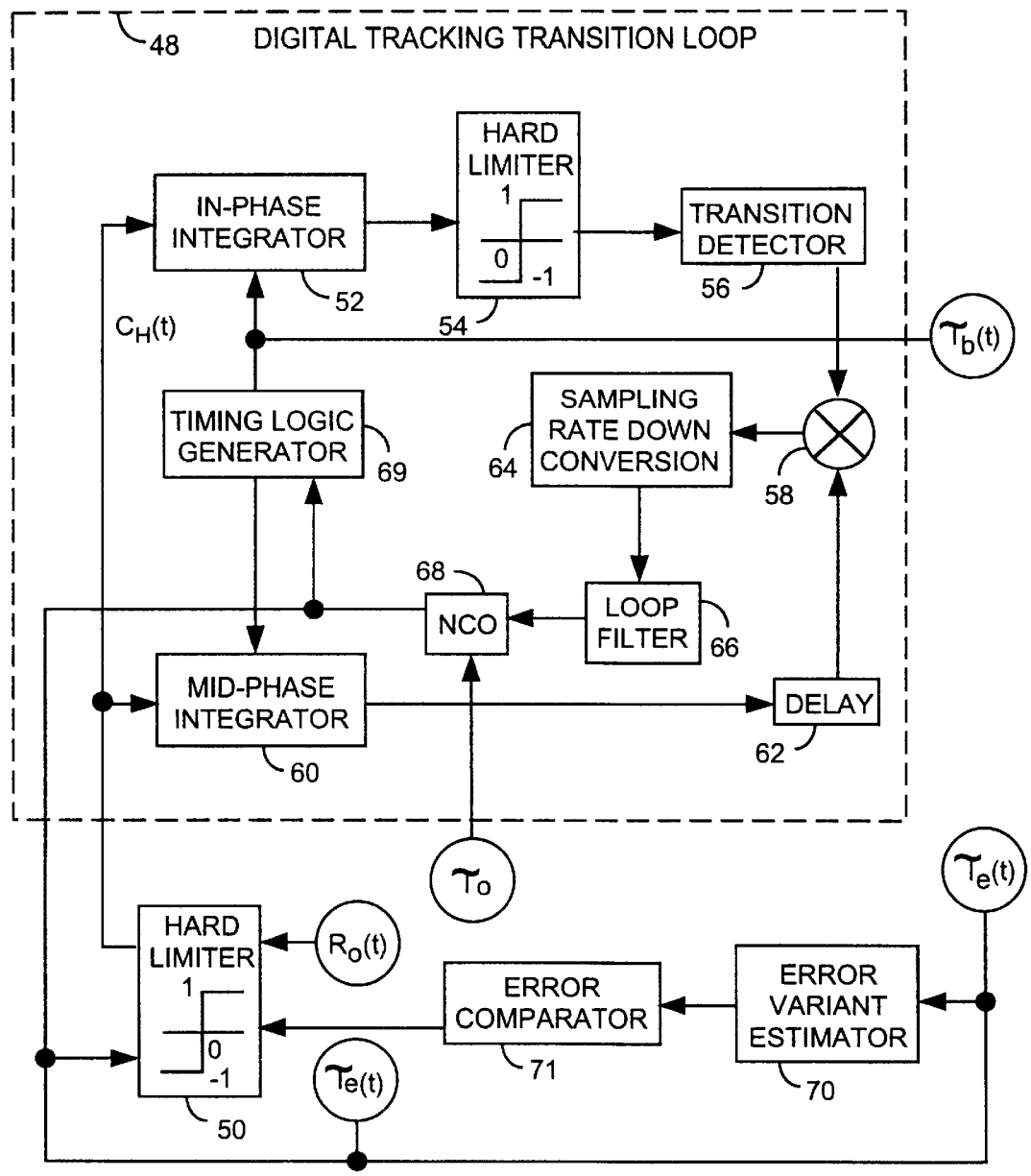
FIG. 2 is a block diagram of the GMSK timing recovery loop including the digital tracking transition loop and the hard limiter.

Referring to FIGS. 1 and 2, and more particularly to FIG. 2, the GMSK timing recovery loop includes the new hard limiter 50 and the conventional digital tracking loop 48 including an in-phase integrator 52, a hard limiter 54, a transition detector 56, a mixer 58, a mid-phase integrator 60, a delay 62, a sampling rate down converter 64, loop filter 66, a numerically controlled oscillator (NCO) 68, and a timing logic generator 69. An error variant estimator 70 and an error comparator 71 are used for initial bit timing synchronization.

The hard clocking signal $C_H(t)$ is fed into the integrators 52 and 60. The in-phase integrator 52 and mid-phase integrator 60 are used to generate an error bit timing signal τe(t) in a close loop operation. The in-phase integrator 52 provides an in-phase continuous signal with zero crossings. The in-phase continuous signal is hard limited between plus or minus values by limiter 54 providing an in-phase square wave signal to the transition detector 56 detecting positive to negative and negative to positive transitions of the in-phase square wave signal. The mid-phase integrator 60 integrates from $-T/2$ to $+T/2$, where T is the bit period, to provide an error output communicated to the delay 62 that is mixed with the output of the transition detector 56. The mid-phase output is delayed by delay 62 to match in time for synchronization with the output of the transition detector 56. The mixer 58 provides a positive or negative error signal to the converter 64 that is respectively used to advance or retard the bit timing signal τ(t) by an amount corresponding to the error output of the mid-phase integrator 60. The sampling rate converter 58 provides a down sampled error signal to the loop filter 66 that averages and converts the timing tracking errors into a numerical value that is communicated to the numerically controlled oscillator 68 that then adjusts the digital value of the initial frequency estimate τo to the current bit timing error signal τe(t) communicated to the timing logic generator 69 for adjusting the bit timing signal τb(t). The timing logic generator 69 provides signal synchronization between the bit timing signal error τe(t) and the bit timing signal τb(t) clocking the integrators 52 and 60 to maintain the digital tracking loop 48 in synchronization in reference to the demodulated signal Ro(t).

In operation, the NCO 68 provides the bit timing error signal τe(t) that is fed into the hard limiter 50 that in turn provides the hard clocking signal $C_H(t)$ as part of a control feed back loop in which the hard limiter 50 functions to adjust the zero crossings transition of the received signal Ro(t) by an amount indicated by the bit timing signal error τe(t). Initially, the initial bit timing estimate signal τo is received by the NCO 68 for setting the initial bit time signal error τe(t), and hence the bit timing signal τb(t). The error variance estimator 70 provides an error signal indicating the first moment and second moment of the bit timing signal τb(t). The error variant signal is then communicated to the error comparator 71 that compares error variant signal to a predetermined value to determine if multiples of the zero crossings of the received signal Ro(t), indicating the bit period is within at least ½ of the bit period of the bit timing signal τb(t). The comparator 71 communicates an initialization signal to the hard limiter indicating when the DTTL bit timing signal τb(t) is within at least ½ of the bit period of the demodulated receive signal Ro(t). If that is not true, the hard limiter does not adjust the hard limiter signal $C_H(t)$ by the bit timing error signal τe(t) from the DTTL 48 and the clock signal $C_H(t)$ is triggered only by zero crossing of the received signal Ro(t). The unadjusted clock signal $C_H(t)$ is communicated to the DTTL for updating the bit timing signal τb(t) to be within at least ½ of the bit periods of the received signal Ro(t). Once the bit timing signal τb(t) is initially updated, the hard limiter 50 then adjusts the transitions of hard clocking signal $C_H(t)$ corresponding to the zero crossings of the received signal Ro(t) to be in synchronism with transitions of the bit timing signal τb(t). By way of example, the carrier frequency fc may be 1 MHz with a bit period of one microsecond in a channel having a BSNR of 6 db. During initialization, the error variance estimator 70 may provide an error variance of between 2.0 to 0.6 percent. The comparator 71 may have a predetermined error variance value of 0.5 percent. After initialization, the error variance may drop to 0.4 percent, indicating reduced jitter, as the hard limiter 50 adjusts the hard clock signal $C_H(t)$, by an amount indicated by the bit timing error signal τe(t), at which time, the DTTL stabilizes the bit timing signal τb(t) with reduced jitter for improved data recovery.

Bit synchronization timing improvement is perfected by the use of the hard limiter 50 within the feed back loop of the digital tracking loop 48 in which the limiter 50 receives the bit timing error signal τe(t) adjusted into the hard clock signal $C_H(t)$ using the demodulated receive signal Ro(t). The demodulated receive signal Ro(t) is a continuous signal that has zero crossings at multiples of the bit period. However, the zero crossing waveforms do not have sharp transitions and have superimposed noise, and consequently, the bit timing from the zero crossings of the received signal Ro(t) will jitter from zero crossing to zero crossing thereby producing poor triggering transitions. However, the hard limiter 50, after the initial adjustment, adjusts these poor triggering transitions of the received signal Ro(t) to be in synchronism with the transitions of the bit timing signal τb(t) having consistent bit periods referenced to sharp transitions for stable DTTL clocking through reduced jittering of the hard clocking signal $C_H(t)$ to thereby reduce the jitter in the bit timing signal τb(t), for improved data detection.

The digital tracking transition loop 48 of conventional design optimally operates upon square waveforms having sharp transition at the zero crossings having a predetermined consistent bit period between zero crossings, but not upon analog type GMSK demodulated signals Ro(t) that would otherwise result in poor bit time synchronization and excessive jitter, due to noise and Gaussian filtering. Hence, the hard limiter 50 is used to square demodulated waveform Ro(t) so as to provide the DTTL 48 with sharp zero crossing transitions for improved synchronization. The time duration between the zero crossings of the GMSK demodulated receive signal Ro(t) is a multiple of the bit period. The hard limiter 50 functions as a comparator in respect to the demodulated receive signal Ro(t) to generate a square wave having multiple bit period duration then adjusted by the bit timing signal τb(t) so that the hard limiter 50 provides the square wave hard clocking signal $C_H(t)$ square wave each having the same bit period with slight timing errors upon which the DTTL operates to adjust the bit timing signal τb(t) under close loop control.

Figure 3:
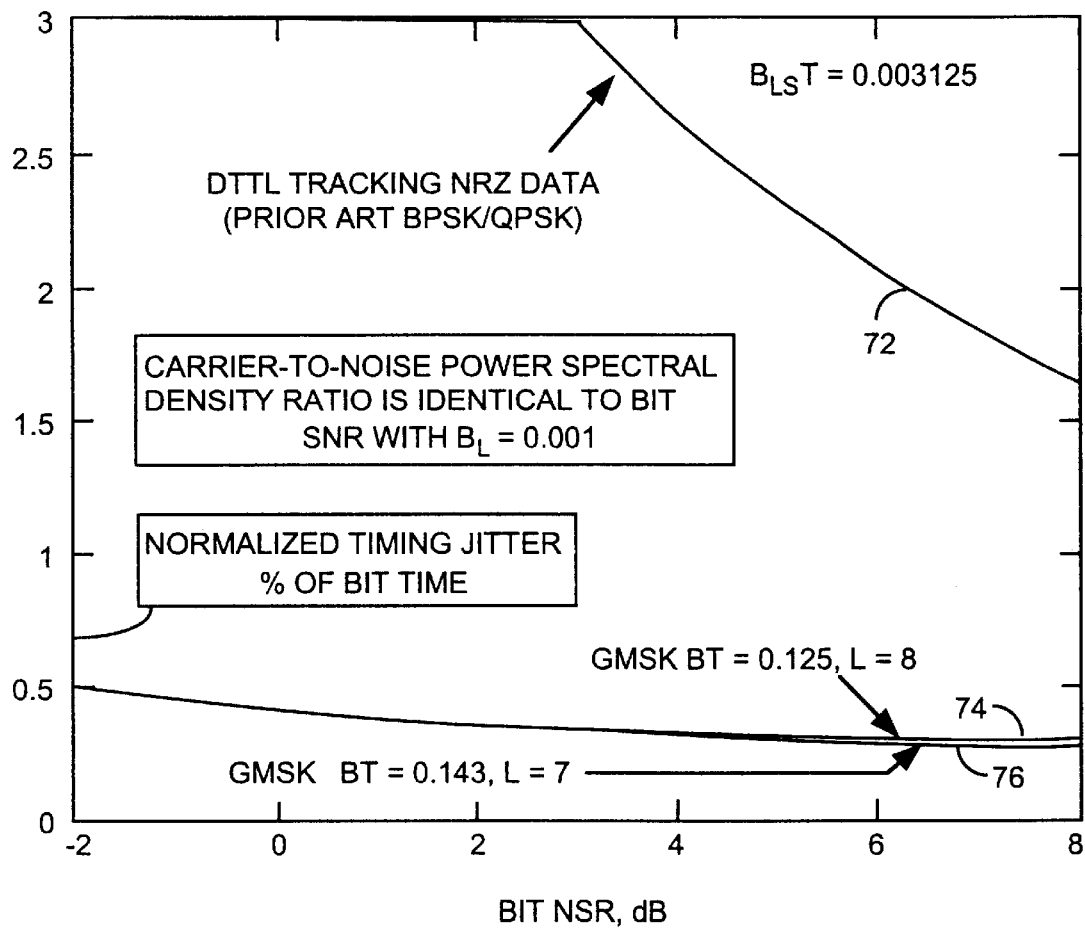
FIG. 3 is a normalized timing jitter plot depicting an improvement in bit synchronization time jitter.

Referring to all of the Figures, and more particularly to FIG. 3, conventional BPSK or QPSK timing jitter performance 72 is improved by the GMSK jitter performance 74 and 76, for GMSK timing recovery loops responsive to a GMSK filter having BT equal to 0.125 and a truncation length L of eight, or to a GMSK filter having a BT equal to 0.143 and a truncation length of seven, respectively. The GMSK jitter performances 74 and 76 is improved over GMSK systems using conventional squaring loops. Those skilled in the art can make enhancements, improvements and modifications to the invention, and these enhancements, improvements and modifications may nonetheless fall within the spirit and scope of the following claims.

What is claimed is:

1. A demodulator in a receiver receiving a Gaussian minimum shift keying (GMSK) signal and for generating a bit timing signal, the GMSK signal is derived from a Gaussian filter receiving bit pulses having a predetermined bit period and providing pulse responses for modulating a carrier signal into the GMSK signal, the receiver generating a carrier frequency estimate, a carrier phase estimate and a bit timing estimate, the demodulator comprising, a GMSK carrier tracking loop for receiving the GMSK signal, the carrier phase estimate and the carrier frequency estimate for demodulating the carrier signal of the GMSK signal for providing a demodulated received signal having zero crossing at multiples of the bit period, a digital tracking transition loop for receiving a hard clocking signal and the bit timing estimate and for generating the bit timing signal and a bit timing error signal, and a hard limiter for receiving the demodulated received signal and the bit timing error signal for providing the hard clocking signal that is a square wave signal having transitions at zero crossings of the demodulated received signal with the transitions adjusted by the bit timing error signal to be in synchronism with the bit timing signal.

2. The demodulator of claim 1 wherein the digital tracking transition loop and hard limiter for a GMSK timing recovery loop, the GMSK timing recovery loop comprises, an error variance estimator for receiving the bit timing error signal and for generating estimates of the first and second moments of the bit timing error signal, and a comparator for comparing the estimates of the first and second moments to a predetermined value for indicating initial synchronization of the bit timing signal to the demodulated received signal, the hard limiter adjusting the transitions of the demodulated received signal after initial synchronization of the bit timing signal.

3. The demodulator of claim 1 wherein the GMSK carrier tracking loop is a reverse carrier demodulator for generating the demodulated received signal at a baseband frequency of the predetermined bit period.

4. The demodulator of claim 1 wherein, time periods of high and low levels of the demodulated received signal are multiples of the predetermined bit period, the hard limiter provides the hard clocking signal having zero crossings at multiples of the predetermined bit period, and the digital tracking transition loop receives the hard limiting clock signal for sampling multiples of the predetermined bit period for converting the hard clocking signal into the bit timing signal having bit periods equal to the predetermined bit period.

5. The demodulator of claim 1 wherein, time periods of high and low levels of the demodulated received signal are multiples of the predetermined bit period, the hard limiter provides the hard clocking signal having zero crossings at multiples of the predetermined bit period, and the digital tracking transition loop receives the hard limiting clock signal for sampling multiples of the predetermined bit period for converting the hard clocking signal into the bit timing signal having bit periods equal to the predetermined bit period, the hard limiter receives the bit timing error signal from the digital tracking transition loop and provides the hard clocking signal to the digital tracking transition loop in a closed loop.

6. A demodulator in a receiver receiving a Gaussian minimum shift keying (GMSK) signal and for generating a bit timing signal, the GMSK signal is derived from a Gaussian filter receiving bit pulses having a predetermined bit period and providing pulse responses for modulating a carrier signal into the GMSK signal, the receiver generating a carrier frequency estimate, a carrier phase estimate and a bit timing estimate, the demodulator comprising, a GMSK carrier tracking loop for receiving the GMSK signal, the carrier phase estimate and the carrier frequency estimate for demodulating the carrier signal of the GMSK signal for providing a demodulated received signal having zero crossing at multiples of the bit period, time periods of high and low levels of the demodulated received signal are multiples of the predetermined bit period, a digital tracking transition loop for receiving a hard clocking signal and the bit timing estimate and for generating the bit timing signal and a bit timing error signal, a hard limiter for receiving the demodulated received signal and the bit timing error signal for providing the hard clocking signal that is a square wave signal having transitions at zero crossings of the demodulated receive signal with the transitions adjusted by the bit timing error signal to be in synchronism with the bit timing signal, the hard limiter receives the bit timing error signal from the digital tracking transition loop and provides the hard clocking signal to the digital tracking transition loop, the hard clocking signal is adjusted by the bit timing error signal in a closed loop, an error variance estimator for receiving the bit timing error signal and for generating estimates of the first and second moments of the bit timing error signal, and a comparator for comparing the estimates of the first and second moments to a predetermined value for indicating initial synchronization of the bit timing signal to the demodulated received signal, the hard limiter adjusting the transitions of the demodulated received signal when generating the hard clocking signal after initial synchronization of the bit timing signal.

7. A receiver for receiving a Gaussian minimum shift keying (GMSK) signal and for estimating data communicated by the GMSK signal, the GMSK signal is derived from a Gaussian filter receiving bit pulses having a predetermined bit period and providing pulse responses for modulating a carrier signal into the GMSK signal, the receiver comprising, an antenna for receiving the GMSK signal as a received signal, a carrier phase acquisition loop for receiving the received signal and for generating a carrier phase estimate, a carrier frequency acquisition loop for receiving the received signal and for generating a carrier signal estimate, a timing acquisition loop for receiving the received signal and for generating a bit timing estimate, a carrier tracking loop for receiving the received signal, the carrier phase estimate and the carrier frequency estimate for coherently demodulating the carrier signal of the received signal and for providing a demodulated received signal having zero crossings at multiples of the predetermined bit period, time periods of high and low levels of the demodulated received signal are multiples of the predetermined bit period, a digital tracking transition loop for receiving a hard clocking signal and the bit timing estimate and for generating a bit timing signal and a bit timing error signal, a hard limiter for receiving the demodulated received signal and bit timing error signal for providing the hard clocking signal that is a square wave signal having transitions at zero crossings of the demodulated received signal with the transitions adjusted by the bit timing error signal to be in synchronism with the bit timing signal, the hard limiter receives the bit timing error signal from the digital tracking transition loop and provides the hard clocking signal to the digital tracking transition loop, the hard clocking signal is adjusted by the bit timing error signal in a closed loop, an error variance estimator for receiving the bit timing error signal and for generating estimates of the first and second moments of the bit timing error signal, comparator for comparing the estimates of the first and second moments to a predetermined value for indicating initial synchronization of the bit timing signal to the demodulated received signal, the hard limiter adjusting the transitions of the demodulated received signal after initial synchronization of the bit timing signal to generate the hard clocking signal, and a data detector for receiving the demodulated received signal and the bit timing signal for estimating data communicated by the GMSK signal.

* * * * *